(12) United States Patent
Francis et al.

(10) Patent No.: US 11,592,962 B2
(45) Date of Patent: Feb. 28, 2023

(54) ONLINE TOOL GRAPHICAL USER INTERFACE WITH TILES

(71) Applicant: salesforce.com, inc., San Francisco, CA (US)

(72) Inventors: Denise Nicole Francis, Los Angeles, CA (US); Paul Joseph Nix, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/162,869

(22) Filed: Jan. 29, 2021

(65) Prior Publication Data

US 2022/0244816 A1 Aug. 4, 2022

(51) Int. Cl.
*G06F 3/0482* (2013.01)
*G06N 20/00* (2019.01)
*H04L 29/08* (2006.01)
*H04L 67/55* (2022.01)

(52) U.S. Cl.
CPC ........... *G06F 3/0482* (2013.01); *G06N 20/00* (2019.01); *H04L 67/55* (2022.05)

(58) Field of Classification Search
CPC ........ G06F 3/0482; G06N 20/00; H04L 67/26
See application file for complete search history.

(56) References Cited

U.S. PATENT DOCUMENTS

| | | | |
|---|---|---|---|
| 8,001,470 B1* | 8/2011 | Chen | G06F 9/453 715/714 |
| 2014/0344024 A1* | 11/2014 | Kempf | G06Q 10/06393 705/7.39 |
| 2017/0329483 A1* | 11/2017 | Jann | G06F 3/04817 |
| 2017/0329500 A1* | 11/2017 | Grammatikakis | G06F 3/0482 |
| 2020/0051118 A1* | 2/2020 | Singhai | G06N 20/00 |
| 2020/0195600 A1* | 6/2020 | Hyman | H04L 51/046 |

* cited by examiner

*Primary Examiner* — Tadesse Hailu
*Assistant Examiner* — Darrin Hope
(74) *Attorney, Agent, or Firm* — Sterne, Kessler, Goldstein & Fox P.L.L.C.

(57) ABSTRACT

Disclosed herein are system, method, and computer program product embodiments for generating and managing an online tool GUI with tiles. An embodiment operates by causing the online tool GUI to be displayed responsive to a request to access the online tool GUI from a user. The online tool GUI includes: a first main tile including a use-case for a first online tool; a first use-case navigation button configured to generate, when selected, a request for the first main tile to be displayed within the online tool GUI; and a second use-case navigation button configured to generate, when selected, a request for a second main tile to be displayed within the online tool GUI. In response to a selection of the second use-case navigation button, the online tool GUI replaces the first main tile with the second main tile including a use-case for a second online tool.

17 Claims, 5 Drawing Sheets

FIG. 4

ONLINE TOOL GRAPHICAL USER INTERFACE WITH TILES

BACKGROUND

Many online tools are available for use within a cloud computing environment. However, it is difficult for a user (e.g. a business entity) to explore these online tools and understand how these online tools can be applied to the user's data to better understand customers and improve relationships with customers. Accordingly, what is needed is a central location for exploring the various online tools and visualizing the potential output of these online tools based on the user's data.

BRIEF DESCRIPTION OF THE DRAWINGS/FIGURES

The accompanying drawings are incorporated herein and form a part of the specification.

FIG. 4 shows an example of an online tool GUI in accordance with one or more embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for generating and managing an online tool GUI. The online tool GUI may include multiple tool tiles displaying previews of the analytic capabilities of multiple online tools within a cloud computing environment. The online tool GUI is also configured to display multiple main tiles, where each main tile corresponds to one or more of the online tools. The online tool GUI may display multiple use-case navigational buttons for switching between the multiple main tiles. Further, the online tool GUI may display links to online help or online discussion forms for the online tools.

Figure 1:
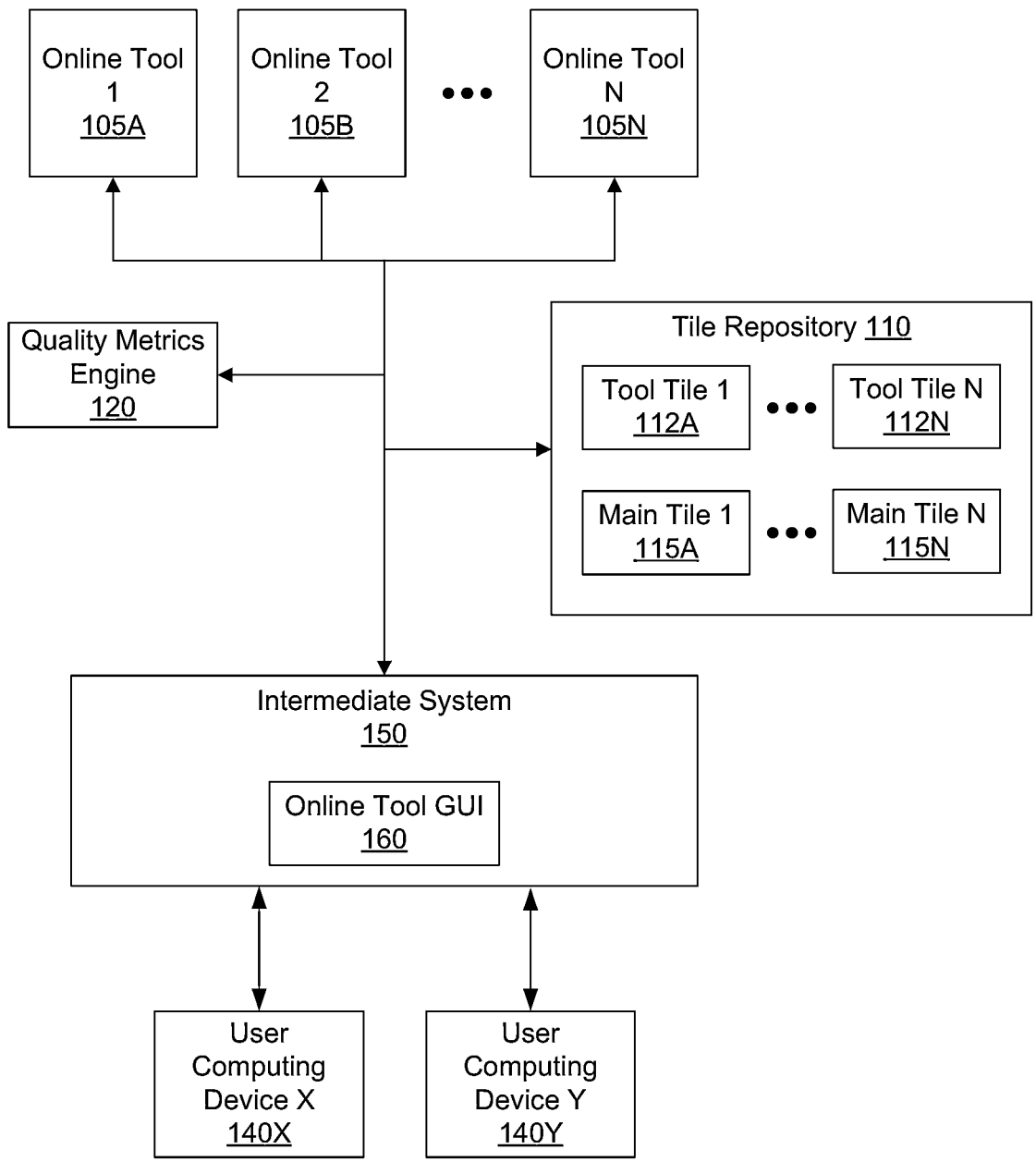
FIG. 1 shows a block diagram of a system for generating and managing an online tool GUI in accordance with one or more embodiments.

FIG. 1 shows a system for generating and managing an online tool GUI in accordance with one or more embodiments. The online tool GUI is a gateway for exploring and accessing one or more online tools. These online tools may be an integrated set of artificial intelligence (AI) technologies that include machine learning, deep learning, predictive analytics, natural language processing, and smart data discovery. These online tools are focused on discovering relevant insights, predicting future customer behavior, proactively recommending best next actions and even automating tasks for users (e.g., business entities, charities, government agencies, etc.).

As shown in FIG. 1, the system has multiple components including, for example, one or more online tools (e.g., online tool 1 105A, online tool 2 105B, online tool N 105N), a tile repository 110, a quality metrics engine 120, an intermediate system 150, and an online tool GUI 160. Each of these components (105, 110, 120, 150, 160) may execute on one or more computing devices (e.g., server, mainframe, desktop personal computer (PC), laptop, smart phone, tablet PC, etc.) connected by a network having wired and/or wireless segments. Moreover, two or more of the components (105, 110, 120, 150, 160) may execute on the same computing device. These components may be part of an online cloud computing environment or platform.

In one or more embodiments, the online tools generate analytics (e.g., charts, graphs, tables, key performance indicators (KPIs), etc.) for one or more users (e.g., individuals, business entities, charities, government organizations, etc.). The analytics may be marketing analytics based on user data (e.g., user marketing data).

For example, online tool 1 105A may predict consumer engagement with a user's email and mobile push messaging. Online tool 1 105A may input the user's customer data and use machine learning to generate predictive models that assign scores for every contact's likelihood to open and click emails and to interact with push notifications. As another example, online tool 2 105B evaluates the user's contacts and subscribers and identifies the optimal number of email messages to send. As another example, online tool 3 (not shown) may determine the best time to send a message to a customer of the user. Online tool 3 (not shown) utilizes machine learning to predict optimal send times so that the message is likely to be opened. As yet another example, online tool N 105N monitors the open rate, click rate, and unsubscribe rates of a user's email sends, including batch sends and journey sends. When an anomalously high or low result compared to the expected values is identified, online tool N 105N generates an insight denoting the anomaly and its context.

In one or more embodiments, each of the online tools 105 is configured to generate a tool tile 112. For example, online tool 1 105A may generate tool tile 1 112A, while online tool N 105N may generate tool tile N 112N. Each tool tile includes a preview of the online tool's analytic capabilities ("analytic preview"). Accordingly, each tool tile may include analytics (e.g., charts, graphs, tables, key performance indicators (KPIs), etc.). In one or more embodiments, each online tool 105 generates a single tool tile 112 based on the user data (e.g., marketing data) of a hypothetical or a test user. In such embodiments, the same tool tiles 112 are shown to every user. In one or more embodiments, one or more tool tiles 112 may be custom generated for a user based on the user's data (e.g., marketing data). In such embodiments, each tool tile 112 is still a preview of the analytic capabilities of one of the online tools 105, but the analytic preview pertains specifically to the user. Each tool tile 112 may include a link to access the corresponding online tool 105.

In one or more embodiments, the tile repository 110 stores the one or more tool tiles 112. As mentioned above, each of the tool tiles 112 includes an analytic preview corresponding to one of the online tools 105. Different tool tiles 112 may be of different sizes and/or of different shapes. Alternatively, all tool tiles 112 may be of the same size and have the same shape.

In one or more embodiments, the tile repository 110 stores one or more main tiles 115. Each main tile 115 corresponds to one or more of the online tools 105. For example, main tile 1 115A corresponds to online tool 1 105A, while main tile N 115N corresponds to online tool N 105N. Each main tile 115 may include a description of the corresponding online tool including the analytic capabilities of the online tool, one or more goals (e.g., marketing goals) that can be achieved by utilizing online tool, and/or use-cases involving the online tool. In one or more embodiments, one or more of the main tiles 115 may include a slot for a scaled (e.g., smaller) version of a tool tile (discussed below). Different main tiles may be of different sizes and shapes. Alternatively, all main tiles may be the same size and same shape.

In one or more embodiments, the quality metrics engine 120 is configured to generate one or more quality metrics based on the user's data (e.g., marketing data). The quality metrics reflect the quality of the user's data. Additionally or alternatively, the quality metrics reflect how the user's data could be improved using one or more of the online tools 105. Similar to the machine learning and predictive analytics engine in one or more of the online tools 105, the quality metrics engine 120 interfaces with the online tool GUI 160 tool (discussed below) in order to surface high-level insights to the user such that the user may be better informed to best use the AI features of the online tools 105. In one or more embodiments, the online tool GUI 160 might not generate the data behind these insights, but acts as an interface and a framework that allows users to easily understand what is working well, and what can be improved in their marketing business operations so they can maximize their value with the predictive capabilities of the online tools 105.

In one or more embodiments, intermediate system 150 generates online tool GUI 160 and/or causes online tool GUI 160 to be displayed on a computing device of a user (e.g., user computing device X 140X, user computing device Y 140Y). Online tool GUI 160 may be configured to display main tiles 115, tool tiles 112, one or more quality metrics from quality metrics engine 120, links to online help for one or more online tools, links to online discussion forums, etc. Online tool GUI 160 may include one or more screens/windows each having one or more GUI widgets (e.g., checkboxes, dropdown boxes, radio buttons, buttons, etc.). Intermediate system 150 may modify what is being displayed within online tool GUI 160 and/or retrieve additional items (e.g., main tiles 115) from other components (e.g., tile repository 110) for display within online tool GUI 160.

Figure 2:
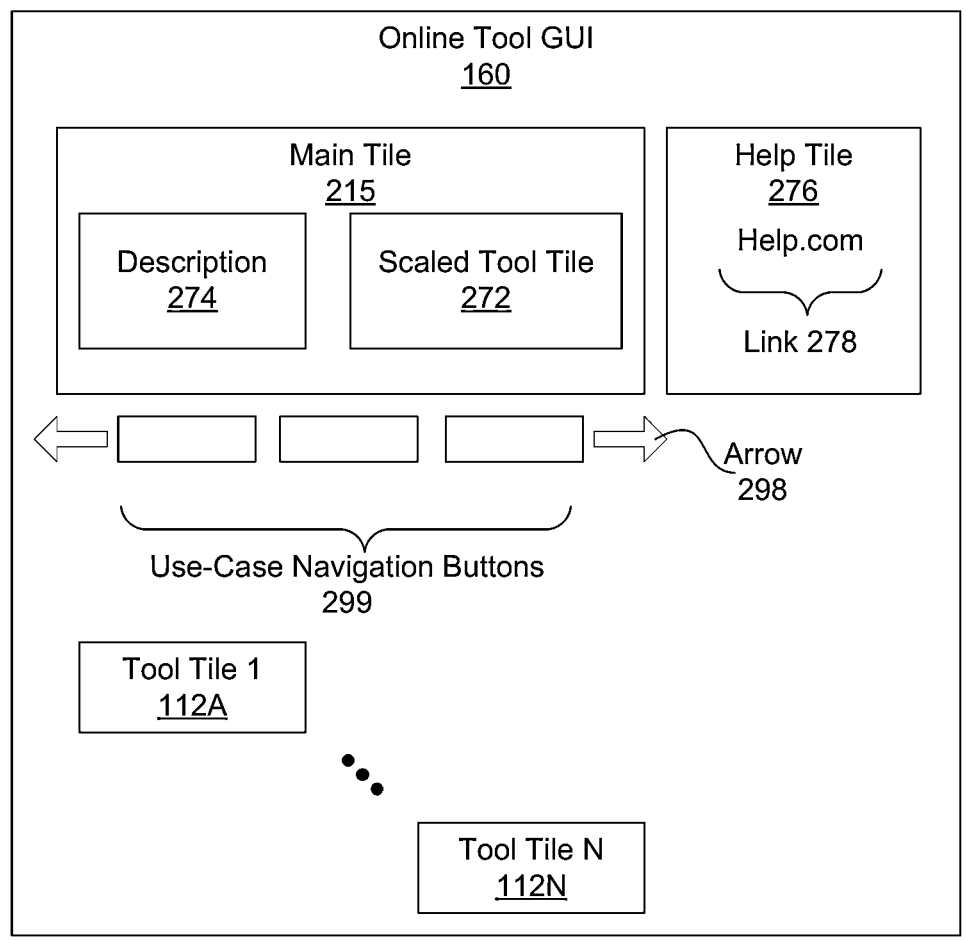
FIG. 2 shows an example of an online tool GUI in accordance with one or more embodiments.

FIG. 2 shows an example of online tool GUI 160 in accordance with one or more embodiments. As shown in FIG. 2, online tool GUI 160 is displaying one or more of the tool tiles 112 (e.g., tool tile 1 112A, tool tile N 112N). These tool tiles 112 may be arranged in a grid format within the online tool GUI 160.

As also shown in FIG. 2, online tool GUI 160 is also displaying a main tile 215. The main tile 215 may be displayed above the tool tiles 112 within the online tool GUI 160. The main tile 215 may larger than each of the tool tiles 112. Main tile 215 may correspond to any of the main tiles 115, discussed above in reference to FIG. 1. The main tile 215 includes a description 274 and a scaled tool tile 272. The main tile 215 corresponds to one of the online tools 105. Accordingly, the description 274 includes the analytic capabilities of the corresponding online tool, one or more goals (e.g., marketing goals) that can be achieved by utilizing the corresponding online tool, and/or use-cases involving the corresponding online tool. The scaled tool tile 272 is a smaller version of the tool tile 112 that also corresponds to the same online tool. For example, if the main tile 215 is main tile 1 115A and thus corresponds to online tool 1 105A, then the scaled tool tile 272 is a smaller version of tool tile 1 112A, since tool tile 1 112A also corresponds to online tool 1 105A. As another example, if the main tile 215 is main tile N 115N and thus corresponds to online tool N 105N, then the scaled tool tile 272 is a smaller version of tool tile N 112N, since tool tile N 112N also corresponds to online tool N 105N. The main tile 215 may include one of the quality metrics (discussed above) that pertains to the same online tool as the main tile 215.

In one or more embodiments, online tool GUI 160 also includes a help tile 276. The help tile 276 may be displayed adjacent to the main tile 215 in the online tool GUI 160. The help tile 276 may include a link 278 (e.g., URL) to online help for one of the online tools 105 (e.g., additional details regarding the online tool, an operating manual for the online tool, use examples of the online tool, frequently asked questions regarding the online tool, etc.). If the main tile 215 corresponds to online tool 1 105A, then the link 278 corresponds to online help for online tool 1 105A. Similarly, if the main tile 215 corresponds to online tool N 105N, then the link 278 corresponds to online help for online tool N 105N.

In one or more embodiments, online tool GUI 160 includes multiple use-case navigation buttons 299. Each of the use-case navigation buttons 299 may correspond to one of the main tiles 115, discussed above in reference to FIG. 1. Each of the use-case navigation buttons 299 may include text (not shown) identifying the corresponding main tile or a use-case described by the corresponding main tile. In response to the selection of a use-case navigation button, a request to display the corresponding main tile is generated and sent to intermediate system 150. The intermediate system 150 may replace (or cause to be replaced) the currently displayed main tile with the main tile referenced in the request.

In one or more embodiments, only a subset of the use-case navigation buttons are displayed at a given time with online tool GUI 160. As shown in FIG. 2, arrows 298 or other displayed indicia may be selected by the user to change the subset of use-case navigation buttons 299 being displayed. As a result of selecting the displayed indicia, some of the currently displayed use-case navigation buttons may disappear while other use-case navigation buttons may appear.

In one or more embodiments, when online tool GUI 160 is displayed for the first time, a home tile is displayed in place of main tile 215. The home tile includes a message welcoming the user to the online tool GUI 160 and encouraging the user to explore and learn about all the features of the online tools 105. The home tile might also include one or more of the quality metrics discussed above. Following the selection of one of the use-case navigation buttons 299, the intermediate system 150 may replace (or cause to be replaced) the currently displayed home tile with the main tile corresponding to the selected use-case navigation button.

In one or more embodiments, the online tool GUI 160 may include a link (not shown) (e.g., URL) to an online discussion forum regarding one or more of the online tools 105. The online discussion forum is a venue or social media platform for various users to discuss the online tools, exchange ideas and/or questions and answers regarding the online tools, etc. The link to the online discussion forum may be displayed on a separate tile (not shown) within the arrangement of the tool tiles 112. Additionally or alternatively, the link to the online discussion forum may be located within one of the tool tiles 112, the main tile 215, the help tile 276, and/or a separate tile (not shown) adjacent to the help tile 276 or main tile 215.

Figure 3:
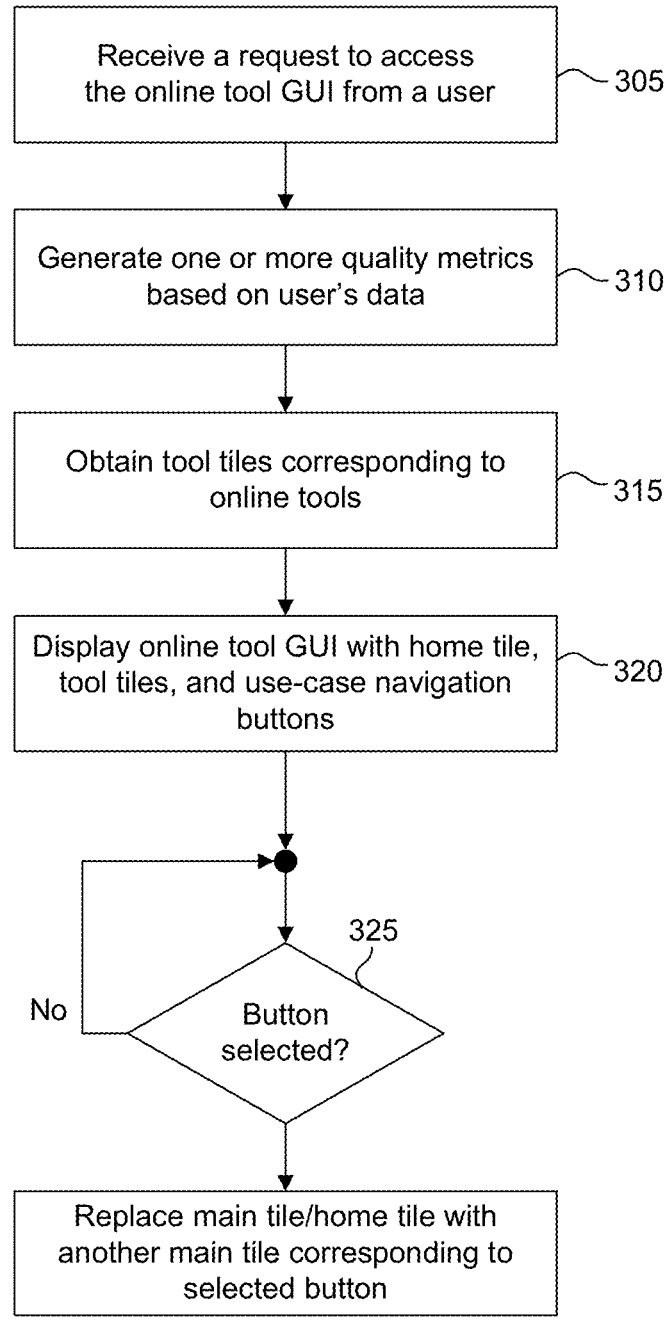
FIG. 3 shows a flowchart for generating and managing an online tool GUI in accordance with one or more embodiments.

FIG. 3 shows a flowchart for generating and managing an online tool GUI with tiles. The steps in FIG. 3 may be executed by one or more of the components (e.g., online tools 105, intermediate system 150, online tool GUI 160, etc.) discussed above in reference to FIG. 1 and FIG. 2. In one or more embodiments, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3. The steps shown in FIG. 3 may be implemented as computer-readable instructions stored on computer-readable media, where, when the instructions are executed, cause a processor to perform the process of FIG. 3

In Step 305, a request to access the online tool GUI is received from a user. The request may be received by intermediate system 150. The request may be issued automatically in response to the user logging into a cloud computing environment that includes the online tools 105. Alternatively, the request may be invoked by the user selecting a button (or other GUI widget) corresponding to the online tool GUI. If the user already has an account in the cloud computing environment, the user's account may include the user's data (e.g., marketing data).

In Step 310, one or more quality metrics are generated based on the user's data (e.g., marketing data). The quality metrics reflect the quality of the user's data. Additionally or alternatively, the quality metrics reflect how the user's data could be improved using one or more of the online tools. The quality metrics may be generated by the quality metrics engine 120. In one or more embodiments, step 310 is optional and depends on whether the user has made the user's data (e.g., marketing data) available to the cloud computing environment.

In Step 315, one or more tool tiles are obtained. Each tool tile corresponds to one of the online tools. Each tool tile includes an example of the type of analytic output (e.g., charts, graphs, tables, key performance indicators (KPIs), etc.) that may be generated by the corresponding online tool. Accordingly, the tool tile may be considered a preview of the online tool's analytic capabilities ("analytic preview"). Different tool tiles may be different sizes and/or different shapes.

In one or more embodiments, the tool tiles are generated in advanced (e.g., before the process depicted in FIG. 3 begins). Alternatively, one or more of the tool tiles may be generated based on the user's data (e.g., marketing data). In other words, the intermediate system 150 may send the user's data to the one or more online tools to generate the tool tiles. In such embodiments, each tool tile is still a preview of the analytic capabilities of one of the online tools, but the analytic preview pertains specifically to the user. Accordingly, different tool tiles would be generated for different users.

In Step 320, the online tool GUI is displayed on the user's computing device. The online tool GUI may include one or more of the tool tiles (from step 315). The multiple tool tiles may be arranged in a grid. In one or more embodiments, the online tool GUI also includes a home tile with text welcoming the user to the online tool GUI and encouraging the user to learn more about the various online tools. In one or more embodiments, the home tile may include the one or more quality metrics (from step 310).

In one or more embodiments, the online tool GUI includes multiple use-case navigation buttons. Each use-case navigation button corresponds to a different main tile comprising text that describes one or more goals (e.g., marketing goals) and how one or more of the online tools can be utilized to achieve the goals (as discussed above). Text identifying a goal and/or an online tool may be displayed on top of each use-case navigation button. In one or more embodiments, there are many use-case navigation buttons, but only a subset of the use-case navigation buttons are displayed at a given time. Arrows or other displayed indicia may be selected by the user to change the subset of use-case navigation buttons being displayed. As a result of selecting the displayed indicia, some of the currently displayed use-case navigation buttons may disappear while other use-case navigation buttons may appear.

In Step 325, the process waits for a selection of a use-case navigation button within the online tool GUI. Each use-case navigation button may be configured, when selected, to generate a request to display the corresponding main tile. This request may be sent to the intermediate system 150. When it is determined that a use-case navigation button is selected, the process proceeds to Step 330.

In Step 330, the home tile currently being displayed within the online tool GUI is replaced with the main tile corresponding to the selected use-case navigation button. For example, the request to display the main tile may be received by the intermediate system 150, and the intermediate system 150 may replace the home tile with the main tile within the online tool GUI. In addition to the description regarding the one or more goal(s), the main tile may also include a scaled (e.g., smaller) version of the tool tile corresponding to the same online tool. The scaled version of the tool tile may be inserted into the slot of the main tile by intermediate system 150 (discussed above).

For example, assume tool tile 1 112A corresponds to online tool 1 105A. Further, assume main tile 215 includes description 274 that describes one or more goals that can be achieved by utilizing online tool 1 105A and/or the analytic capabilities of online tool 1 105A. In this example, main tile 215 includes a scaled (e.g., smaller) version of tool tile 1 112A (e.g., scaled tool tile 272). The scaled version of the tool tile within the main tile helps the user identify the tool tile with the analytic preview of the online tool for use in achieving the goals.

In one or more embodiments, links to online help and/or online discussion forums (e.g., chat rooms, frequently asked question and answers, reviews by other users, etc.) for the online tool(s) associated with the displayed main tile are displayed within the online tool GUI. Still referring to the previous example, when main tile A is displayed within the online tool GUI, a link to online help regarding online tool A and/or a link to online discussion forums for online tool A may be displayed within main tile A or adjacent to main tile A.

Those skilled in the art, having the benefit of this detailed description, will appreciate that step 325 and step 330 may be repeated multiple times. In other words, the user may select various use-case navigation buttons and with each selection the corresponding main tile may be displayed (replacing the previously displayed main tile) within the online tool GUI. Based on the text in a main tile describing an online tool and the analytic preview of the online tool in a tool tile, the user may be include to use or purchase a subscription to the online tool in order to access the full analytic capabilities of the online tool.

Those skilled in the art, having the benefit of this detailed description, will appreciate that the online tool GUI enables a user to easily explore the multiple online tools via the main tiles and the use-case navigational buttons. Moreover, the scaled tool tile within a main tile enables the user to quickly identify the corresponding tool tile with an analytic preview that pertains to the same online tool as the main tile. This is a technical improvement to the field of interfaces within cloud computing environments and platforms.

Figure 4:
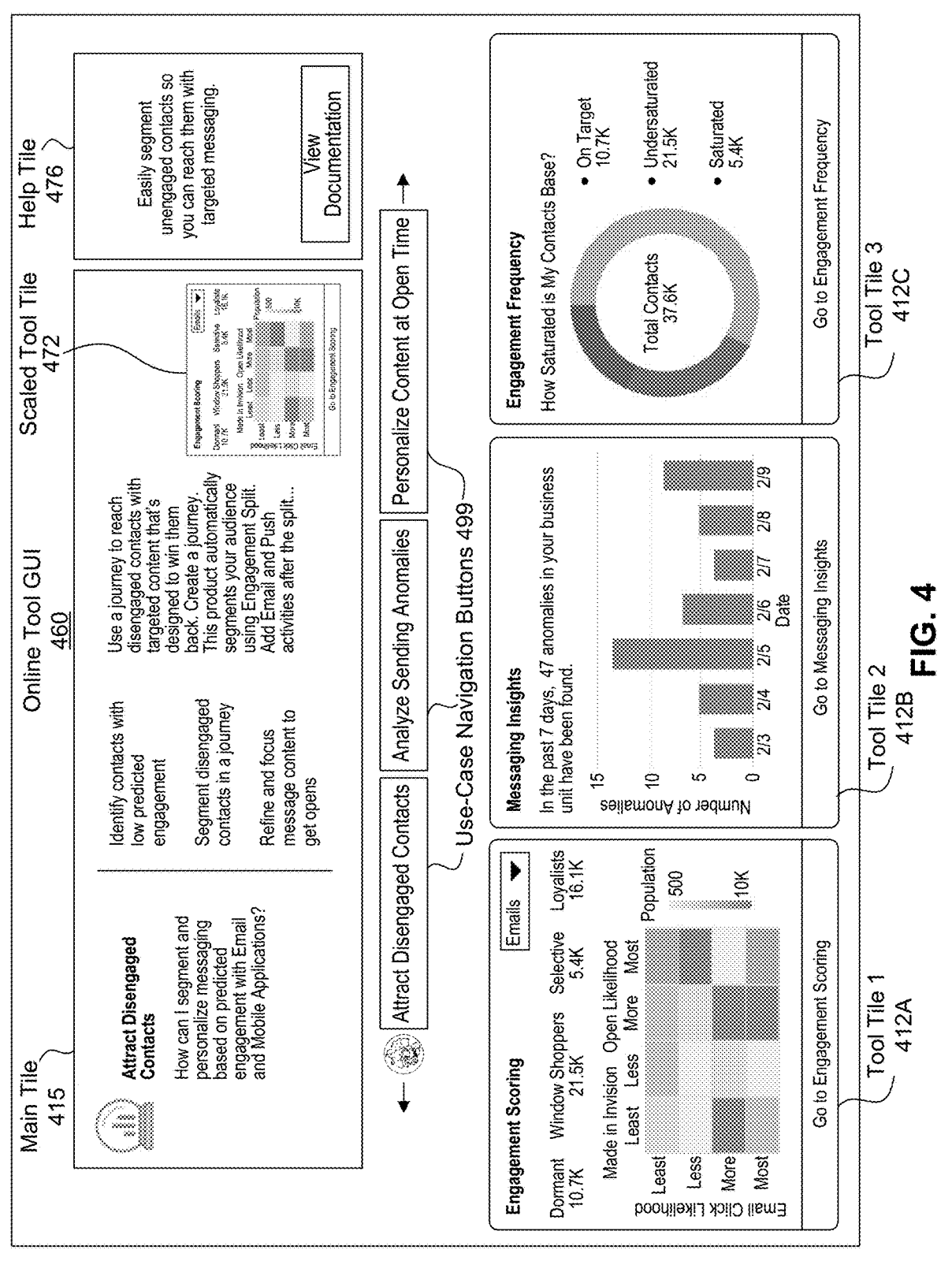

FIG. 4 shows an example of an online tool GUI 460 in accordance with one or more embodiments. The online tool GUI 460 may correspond to online tool GUI 160, discussed above in reference to FIG. 1 and FIG. 2. As also shown in FIG. 4, the online tool GUI 460 includes multiple tool tiles (e.g., tool tile 1 412A, tool tile 2 412B, and tool tile 3 412C). These tool tiles 412 may correspond to tool tiles 112, discussed above in reference to FIG. 1 and FIG. 2. The tool tiles 412 display analytic previews (e.g., graphs, charts, KPIs, etc.) of various online tools.

The online tool GUI 460 also includes multiple use-case navigation buttons 499. These use-case navigational buttons 499 may correspond to use-case navigational buttons 299, discussed above in reference to FIG. 2. In response to selecting one of the use-case navigation buttons 499, the online tool GUI 460 displays a main tile 415. Like main tile 215 (discussed above in reference to FIG. 2), main tile 415 may include a description of one or more online tool(s) including the analytic capabilities of the online tool(s), one or more goals (e.g., marketing goals) that can be achieved by utilizing online tool(s), and/or use-cases involving the online tool(s). The main tile 415 also includes a scaled tool tile 472. The scaled tool tile 472 is a smaller version of one of the tool tiles 412. Specifically, the scaled tool tile 472 is a smaller version of the tool tile that corresponds to the same online tool as the main tile 415. In this example, main tile 415 and tool tile 1 412A both correspond to the same online tool. Accordingly, the scaled tool tile 472 is a smaller version of tool tile 1 412A. The online tool GUI 460 also displays a help tile 476 with a link to online help for the same online tool.

Figure 5:
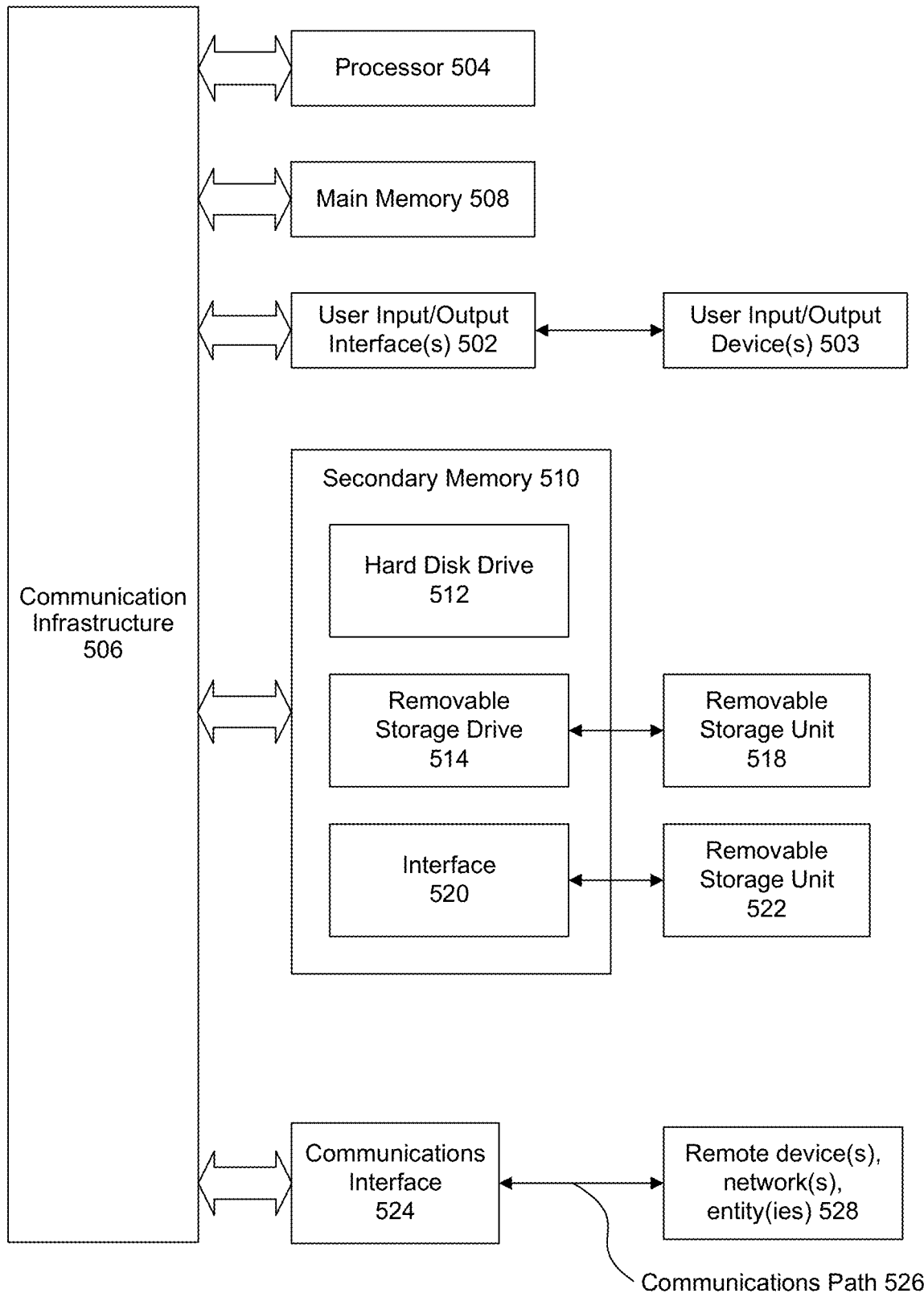
FIG. 5 shows an example computer system useful for implementing various embodiments.

Various embodiments can be implemented, for example, using one or more computer systems, such as computer system 500 shown in FIG. 5. Computer system 500 can be used, for example, to implement the process shown in FIG. 3. Computer system 500 can also be used to implement the GUIs shown in FIG. 2 and FIG. 4. Computer system 500 can be any computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
   causing an online tool graphical user interface (GUI) accessible by a first user of a plurality of different users to be displayed on a computing device responsive to a request to access the online tool GUI from the first user, the online tool GUI being configured to display and receive a selection of one or more of a plurality of online tools, the online tool GUI comprising:
   a plurality of tool tiles, each tool tile corresponding to a respective one of the plurality of online tools and displaying an analytic preview of the respective one of the plurality of online tools, the analytic preview including a subset of the full functionality of the respective one of the plurality of online tools being generated by the respective one of the plurality of online tools using data specific to the first user, and including a link to the respective online tool which, when selected, is configured to grant the first user access to the full functionality of the respective one of the plurality of tools;
   a first main tile corresponding to a first online tool of the one or more online tools, comprising a use-case for the first online tool and a scaled version of a first tool tile indicating that the use-case corresponds to the first tool tile;
   a first use-case navigation button configured to generate, when selected, a request for the first main tile to be displayed within the online tool GUI; and
   a second use-case navigation button configured to generate, when selected, a request for a second main tile to be displayed within the online tool GUI; and
   responsive to a selection of the second use-case navigation button, causing the online tool GUI to replace the first main tile with the second main tile comprising a use-case for a second online tool and a scaled version of a second tool tile indicating that the use-case for the second online tool corresponds to the second tool tile, wherein each of the plurality of different users is one of a business entity, charity, or government organization.

2. The method of claim 1, further comprising:
   sending the data for the user to the first online tool and the second online tool;
   obtaining the first tool tile, wherein the first online tool generates the first tool tile based on the data for the user; and
   obtaining the second tool tile, wherein the second online tool generates the second tool tile based on the data for the user.

3. The method of claim 1, wherein the online tool GUI further displays a link to online help for the first online tool while the first main tile is displayed.

4. The method of claim 1, further comprising: a quality metric indicating a current quality of data for generating a quality metric indicating a current quality of the data for the user,
   wherein the online tool GUI displays a home tile comprising the quality metric.

5. The method of claim 1, wherein the online tool GUI displays a link to an online discussion forum regarding at least one of the first online tool and the second online tool.

6. The method of claim 1, further comprising:
   causing the online tool GUI to display a third use-case navigation button and remove the first use-case navigation button.

7. The method of claim 1, wherein the first online tool predicts consumer engagement with messages using machine learning, and wherein the second online tool evaluates contacts and identifies a number of messages to send to the contacts to increase engagement.

8. A system, comprising:
   a memory; and
   at least one processor coupled to the memory and configured to:
   cause an online tool graphical user interface (GUI), which is accessible by a first user of a plurality of different users, to be displayed on a computing device responsive to a request to access the online tool GUI from the first user, the online tool GUI being configured to display and receive a selection of one or more of a plurality of online tools, the online tool GUI comprising:
   a plurality of tool tiles, each tool tile corresponding to a respective one of the plurality of online tools and displaying an analytic preview of the respective one of the plurality of online tools, the analytic preview including a subset of the full functionality of the respective one of the plurality of online tools being generated by the respective one of the plurality of online tools using data specific to the first user, and including a link to the respective online tool which, when selected, is configure to grant the first user access to the full functionality of the respective one of the plurality of tools;
   a first main tile corresponding to a first online tool of the one or more online tools, comprising a use-case for the first online tool and a scaled version of a first tool tile indicating that the use-case corresponds to the first tool tile;

a first use-case navigation button configured to generate, when selected, a request for the first main tile to be displayed within the online tool GUI; and a second use-case navigation button configured to generate, when selected, a request for a second main tile to be displayed within the online tool GUI; and responsive to a selection of the second use-case navigation button, cause the online tool GUI to replace the first main tile with the second main tile comprising a use-case for a second online tool and a scaled version of a second tool tile indicating that the use-case for the second online tool corresponds to the second tool tile, wherein each of the plurality of different users is one of a business entity, charity, or government organization.

9. The system of claim 8, wherein the at least one processor is further configured to:

send the data for the user to the first online tool and the second online tool;

obtain the first tool tile, wherein the first online tool generates the first tool tile based on the data for the user; and obtain the second tool tile, wherein the second online tool generates the second tool tile based on the data for the user.

10. The system of claim 8, wherein the online tool GUI further displays a link to online help for the first online tool while the first main tile is displayed.

11. The system of claim 8, wherein the at least one processor is further configured to:

generate a quality metric indicating a current quality of the data for the user, wherein the online tool GUI displays a home tile comprising the quality metric.

12. The system of claim 8, wherein the online tool GUI displays a link to an online discussion forum regarding at least one of the first online tool and the second online tool.

13. The system of claim 8, wherein the at least one processor is further configured to:

cause the online tool GUI to display a third use-case navigation button and remove the first use-case navigation button.

14. A non-transitory computer readable medium (CRM) having instructions stored thereon, the instructions, when executed by at least one computing device, cause the at least one computing device to perform operations comprising:

causing an online tool graphical user interface (GUI), which is accessible by a first user of a plurality of different users, to be displayed on a computing device responsive to a request to access the online tool GUI from the first user, the online tool GUI being configured to display and receive a selection of one or more of a plurality of online tools, the online tool GUI comprising:

a plurality of tool tiles, each tool tile corresponding to a respective one of the plurality of online tools and displaying an analytic preview of the respective one of the plurality of online tools, the analytic preview including a subset of the full functionality of the respective one of the plurality of online tools being generated by the respective one of the plurality of online tools using data specific to the first user, and including a link to the respective online tool which, when selected, is configured to grant the first user access to the full functionality of the respective one of the plurality of tools;

a first main tile corresponding to a first online tool of the one or more online tools, comprising a use-case for the first online tool and a scaled version of a first tool tile indicating that the use-case corresponds to the first tool tile;

a first use-case navigation button configured to generate, when selected, a request for the first main tile to be displayed within the online tool GUI; and a second use-case navigation button configured to generate, when selected, a request for a second main tile to be displayed within the online tool GUI; and responsive to a selection of the second use-case navigation button, causing the online tool GUI to replace the first main tile with the second main tile comprising a use-case for a second online tool and a scaled version of a second tool tile indicating that the use-case for the second online tool corresponds to the second tool tile, wherein each of the plurality of different users is one of a business entity, charity, or government organization.

15. The non-transitory CRM of claim 14, the operations further comprising:

sending the data for the user to the first online tool and the second online tool;

obtaining the first tool tile, wherein the first online tool generates the first tool tile based on the data for the user; and obtaining the second tool tile, wherein the second online tool generates the second tool tile based on the data for the user.

16. The non-transitory CRM of claim 14, wherein the online tool GUI displays a link to an online discussion forum regarding at least one of the first online tool and the second online tool.

17. The non-transitory CRM of claim 14, the operations further comprising:

causing the online tool GUI to display a third use-case navigation button and remove the first use-case navigation button.

* * * * *